US009269352B2

(12) United States Patent
Talwar et al.

(10) Patent No.: US 9,269,352 B2
(45) Date of Patent: Feb. 23, 2016

(54) SPEECH RECOGNITION WITH A PLURALITY OF MICROPHONES

(71) Applicant: GM GLOBAL TECHNOLOGY OPERATIONS LLC, Detroit, MI (US)

(72) Inventors: Gaurav Talwar, Detroit, MI (US); Xufang Zhao, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 255 days.

(21) Appl. No.: 13/893,088

(22) Filed: May 13, 2013

(65) Prior Publication Data

US 2014/0337029 A1 Nov. 13, 2014

(51) Int. Cl.
*G10L 15/08* (2006.01)
*H04R 3/00* (2006.01)
*G10L 15/00* (2013.01)

(52) U.S. Cl.
CPC ............. *G10L 15/083* (2013.01); *G10L 15/005* (2013.01); *H04R 3/005* (2013.01); *H04R 2420/07* (2013.01); *H04R 2430/03* (2013.01); *H04R 2499/13* (2013.01)

(58) Field of Classification Search
CPC .. B60R 1/12; B60R 11/0217; B60R 11/0241; B60R 11/0247; B60R 2011/0026; B60R 2011/0033; B60R 2001/1284; B60R 16/0373
USPC ........... 704/233, E15.039, E21.004, E21.012, 704/251; 381/86, 172, 71.4, 91, 97, 365, 381/94.1, 66, 56, 122; 348/370
See application file for complete search history.

(56) References Cited

U.S. PATENT DOCUMENTS

2006/0253282 A1* 11/2006 Schmidt et al. ............... 704/233
2015/0063592 A1* 3/2015 Konchitsky ................. 381/94.1

* cited by examiner

*Primary Examiner* — Charlotte M Baker
(74) *Attorney, Agent, or Firm* — Ingrassia Fisher & Lorenz, P.C.

(57) ABSTRACT

At least first and second microphones with different frequency responses form part of a speech recognition system. The microphones are coupled to a processor that is configured to recognize a spoken word based on the microphone signals. The processor classifies the spoken word, and weights the signals from the microphones based on the classification of the spoken word.

20 Claims, 4 Drawing Sheets

SPEECH RECOGNITION WITH A PLURALITY OF MICROPHONES

TECHNICAL FIELD

The technical field generally relates to speech recognition systems, and more particularly relates to speech recognition systems using a microphone array including at least two microphones which have different frequency responses.

BACKGROUND

Automated recognition of human speech is now possible, and generally involves the use of a microphone to convert the acoustic energy of a spoken word into an electrical signal. The electrical signal is then analyzed by a processor and which is capable of recognizing the spoken word that was converted into the electrical signal by the microphone. After the spoken word is recognized, that word can serve as an instruction for a computer or other electronic device to take an action, such as a command to adjust the temperature setting in a room. The spoken word can also be converted to a typed word, so a person can dictate a letter or other document which is then converted to a typed document without any further human interaction. Other uses of automatic speech recognition are also possible.

People use multiple different languages around the world, and some languages use sounds that are not heard in other languages. Some languages also use the tone or pitch of the spoken word to impart meaning, so proper understanding requires not only recognizing the sounds, but also how the sounds are pronounced. Many of the sounds and tones used in various languages are generally spoken within specific frequency ranges, and these ranges vary widely for different sounds and words. Thus, the ability to detect and interpret sounds within a wide range of frequencies is important for an effective speech recognition system.

All languages use intonation, or tone and pitch, to convey emphasis, contrast, and emotional information. However, tonal languages use tone or pitch to distinguish the meaning of words. For example, phonetically identical words can have entirely different meanings if spoken with different inflections, such as (1) a flat inflection, (2) an increasing tone from the beginning of the word to the end of the word, (3) a falling tone from the beginning of the word to the end of the word, or (4) a tone that falls from the beginning of the word, but then increases for the last part of the word. Different tonal languages will use different types of tone or tone contours.

Sounds are detected by microphones and converted into electrical signals. However, different microphones have different frequency responses, which means that some microphones are more sensitive and effective at converting sounds to electrical signals at certain sound frequencies, and other microphones are more sensitive and effective at other frequencies. Ideally, a microphone will be sensitive and effective at the frequency of the spoken word; however, there is a wide variety of frequencies used in human speech. As a result, some words are not perfectly recognized, and the resulting speech conversion may be inaccurate.

Accordingly, it is desirable to provide a speech recognition system having improved accuracy. Embodiments described herein contemplate the use of an array of microphones with a plurality of different frequency responses to improve the quality of the speech conversion. Furthermore, other desirable features and characteristics of the present invention will become apparent from the subsequent detailed description and the appended claims, taken in conjunction with the accompanying drawings and the foregoing technical field and background.

SUMMARY

A speech recognition system comprises at least first and second microphones which have different frequency responses. The microphones convert acoustic energy to electrical signals. The microphones are coupled to a processor that is configured to recognize spoken words based on electrical signals received from the microphones. The processor determines a classification of the words, and the processor weights the signals received from the microphones based on the classification of the spoken words.

In another embodiment, the speech recognition system is incorporated into the cabin of a motor vehicle. The speech recognition system comprises at least first and second microphones with different frequency responses, where the microphones are positioned to receive acoustic energy from within the vehicle cabin. The microphones are coupled to a processor which is configured to recognize spoken words, and determine a classification of those words. The processor weights the signals received from the microphones based on the classification of the spoken words.

A method for recognizing speech provides at least first and second microphones with a different frequency responses. The microphones convert acoustic energy into electrical signals, and a processor receives those signals. The processor determines the spoken words based on electrical signals received from the microphones, and classifies those spoken words. The processor weights the signals received from the microphones based on the classification of the spoken words.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

As previously mentioned, in tonal languages it is important to listen to the tone and pitch of a spoken word to understand the meaning of that word. This aspect of the language must be accounted for in a speech recognition system identifying spoken words.

In most tonal languages, frequencies below two kilohertz (KHz) are the most important and significant for understanding the spoken word. Some sounds used in communications and language are higher in pitch than others. For example, many English digits have high frequency components, such as "six". Repeated digits are a challenge for speech recognition systems, such as with spoken telephone numbers, and higher frequencies are more important for understanding many of these words. Higher frequencies are also more important for understanding certain specific sounds, such as nasals, plosives, fricatives, and affricates. Nasals are sounds where air escapes through the nose, instead of the mouth, and include the English letters "n" and "m." Plosives are a stop where air flow is blocked, and include "t", "d", "b", and "p." Fricatives are produced by forcing air through a narrow channel, and include "s" and "z." Affricates begin as a stop, but release as a fricative, and include "ch" and "j."

Human speech generally ranges from about zero to twenty KHz, but very few sounds approach the twenty KHz frequency. Recordings that range from zero to about eight KHz are generally adequate to recognize spoken words. However, speech recognition systems can be set up to recognize wider or narrower frequency ranges.

Figure 1:
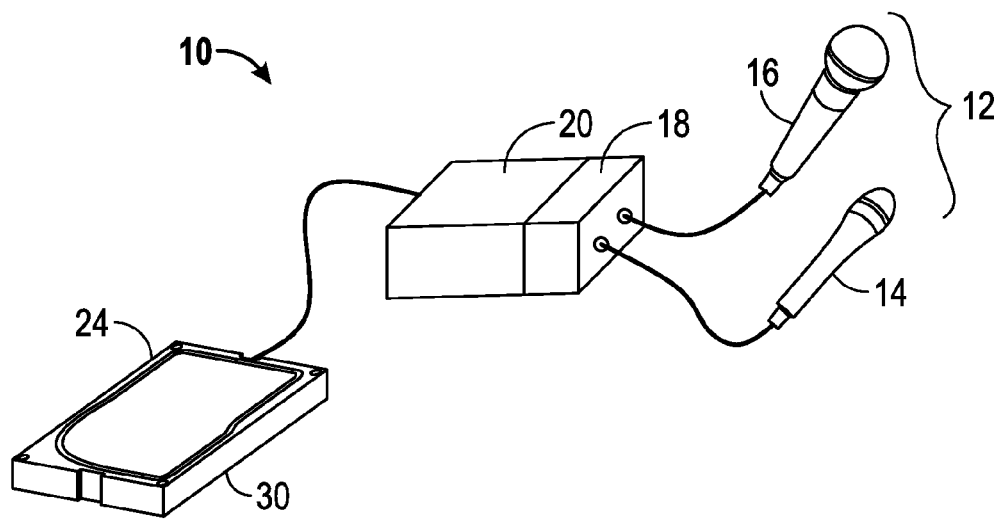
FIG. 1 is an isometric view of a first embodiment of a speech recognition system.
Figure 2:
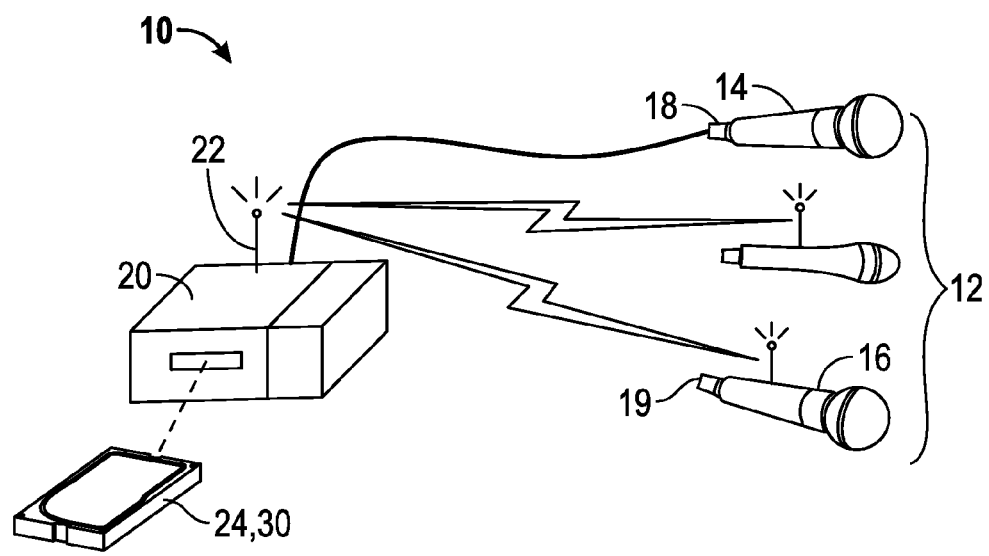
FIG. 2 is an isometric view of a second embodiment of a speech recognition system.

Referring now to FIGS. 1 and 2, there is shown a speech recognition system 10 in accordance with exemplary embodiments. A plurality of microphones 12 (e.g. moving coil, ribbon, condenser, crystal, etc.) are provided for converting acoustic energy into electrical signals. The plurality of microphones 12 form a microphone array, only two of which are shown for simplicity, where the two microphones shown are identified as a first microphone 14 and a second microphone 16.

The microphones 14 and 16 are coupled to a processor 20 through first and second analog to digital (A/D) converters 18 and 19. Any effective coupling may be used, including a hard wired electrical connection, an optical fiber connection, a wireless connection, or a combination of the above. In a wireless connection, the microphone 12 converts acoustic energy into an electrical signal, and then converts the electrical signal into a means of wireless transmission, such as radio waves or other electromagnetic waves. A receiver 22 can then receive the wireless transmission from the microphone 12, and convert that wireless transmission back into an electrical signal for processing. The electrical signal may be converted from analog to digital either before or after wireless transmission.

The electrical signals produced by the microphones 14 and 16 are analog signals that are converted to digital signals in the A/D converters 18 and 19. The outputs of the A/D converters 18 and 19 are coupled to the processor 20, so the A/D converters 18 and 19 are coupled between the microphones 14 and 16 and the processor 20. The A/D converters 18 and 19 may be located with microphones 14 and 16 and/or the processor 20, or it may be a separate component. In some embodiments, the plurality of microphones 14 and 16 may use a single A/D converter 18, such as when the A/D converter 18 is a separate component or attached to the processor 20.

The processor 20 is programmed to recognize spoken words by analyzing the electrical signals received from the microphone 12 to identify the sounds and the word that was spoken. That is, the electrical signal from the microphone 12 varies as the sound reaching the microphone 12 varies, so each sound produces a unique electrical signal that can be identified by the processor 20. As the sounds are identified, the combination of sounds can be interpreted to determine the spoken words.

The processor 20 may include or have access to memory 24 to aid in identifying sounds, recognizing the words, determining a classification of the words, and other aspects of speech recognition. The sampling rate for the processor 20 should be at least twice the desired bandwidth, so a sample rate of sixteen KHz should be used when analyzing speech in the range of zero to eight KHz, but higher sampling rates are also acceptable. For example, if speech frequencies up to twenty KHz were to be analyzed, the sampling rate should be forty KHz or more.

The processor 20 may determine the classification of the spoken words in many different manners, including by language. For example, the processor 20 may be programmed to classify the spoken words as belonging to a tonal language or a non-tonal language. Some languages are more tonal than others, and the processor 20 may be programmed with predetermined criteria to distinguish between tonal and non-tonal languages, as specified by the designer. In other examples, the processor 20 may be programmed to classify the spoken words as belonging to a specific language, such as French, English, Japanese, or other languages. Alternatively, the processor 20 could be programmed to distinguish the spoken word based on the pitch of the speaker, so a distinction could be made between people with deep voices and people with high voices. The processor could be programmed for other classifications as well, such as accents, dialects, or other criteria, as well as combinations of different types of classifications.

Figure 3B:
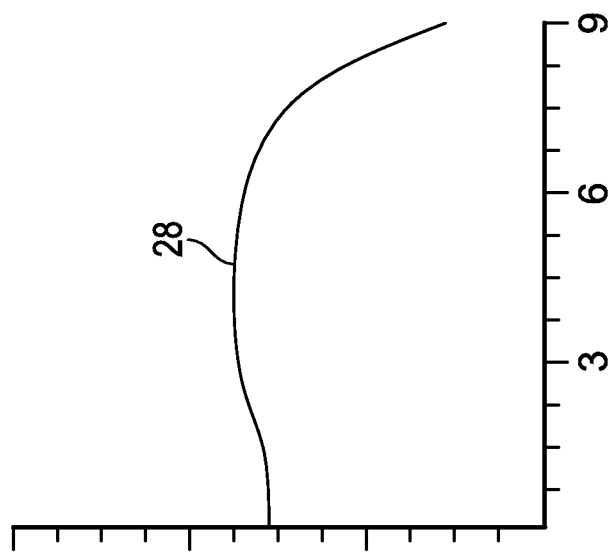
FIGS. 3*a* and 3*b* are curves illustrating first and second frequency responses, respectively, for two different microphones.
Figure 3A:
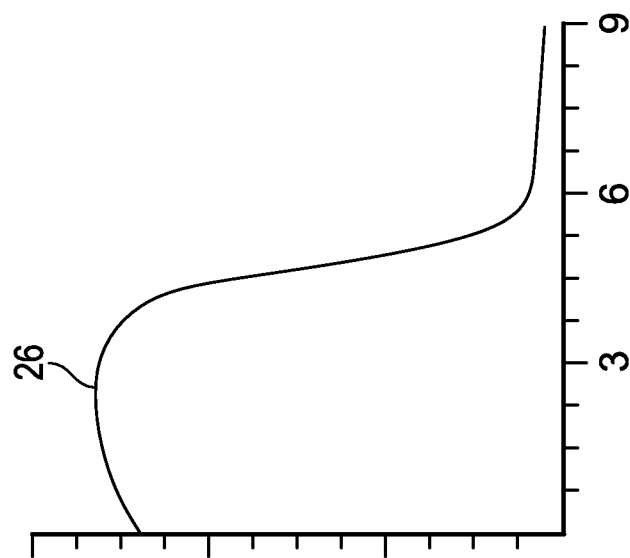

The plurality of microphones 12 comprise at least a first and second microphone 14 and 16 having different first and second frequency responses 26 and 28, respectively, as shown in FIGS. 3a and 3b. Frequency response is the voltage output of a microphone when exposed to a range or sweep of pure tones of equal intensity. The frequency response is a way of measuring how well a microphone 12 will sense a range of tones. Different microphones 12 can have different frequency responses, and certain microphones 12 are better for different tasks.

The first and second frequency responses 26 and 28 shown are hypothetical, but generally represent the first microphone 14 as a narrow band microphone with a strong response for low frequencies, but a much weaker response for high frequencies. The first frequency response 26 has a strong frequency response up to about four KHz, but a significantly lower response for frequencies above about four KHz. The second frequency response 28 is shown for a wide band microphone with a reasonable response for a wide range of frequencies, but not as strong a response for the low frequencies as the narrow band microphone. In other words, the energy amplitude for low frequency bins is relatively lower. One example of a wide band microphone has a reasonable response for frequencies up to about seven KHz, but not as high a response as the narrow band microphone 14 for the lower frequencies. In this example, the first microphone 14 has a higher frequency response than the second microphone 16 for sounds of less than four KHz, and especially for sounds of less than two KHz. However, in other embodiments, the first and second frequency responses 26 and 28 may be different than as illustrated. For tonal languages, speech recognition performance is improved by an appropriate level of amplitude in low frequency bins. There can be special considerations for processing frequencies below five hundred KHz, so additional factors may or may not be used for very low frequencies. These factors would depend on the characteristics of the microphones 12 used.

Figure 4:
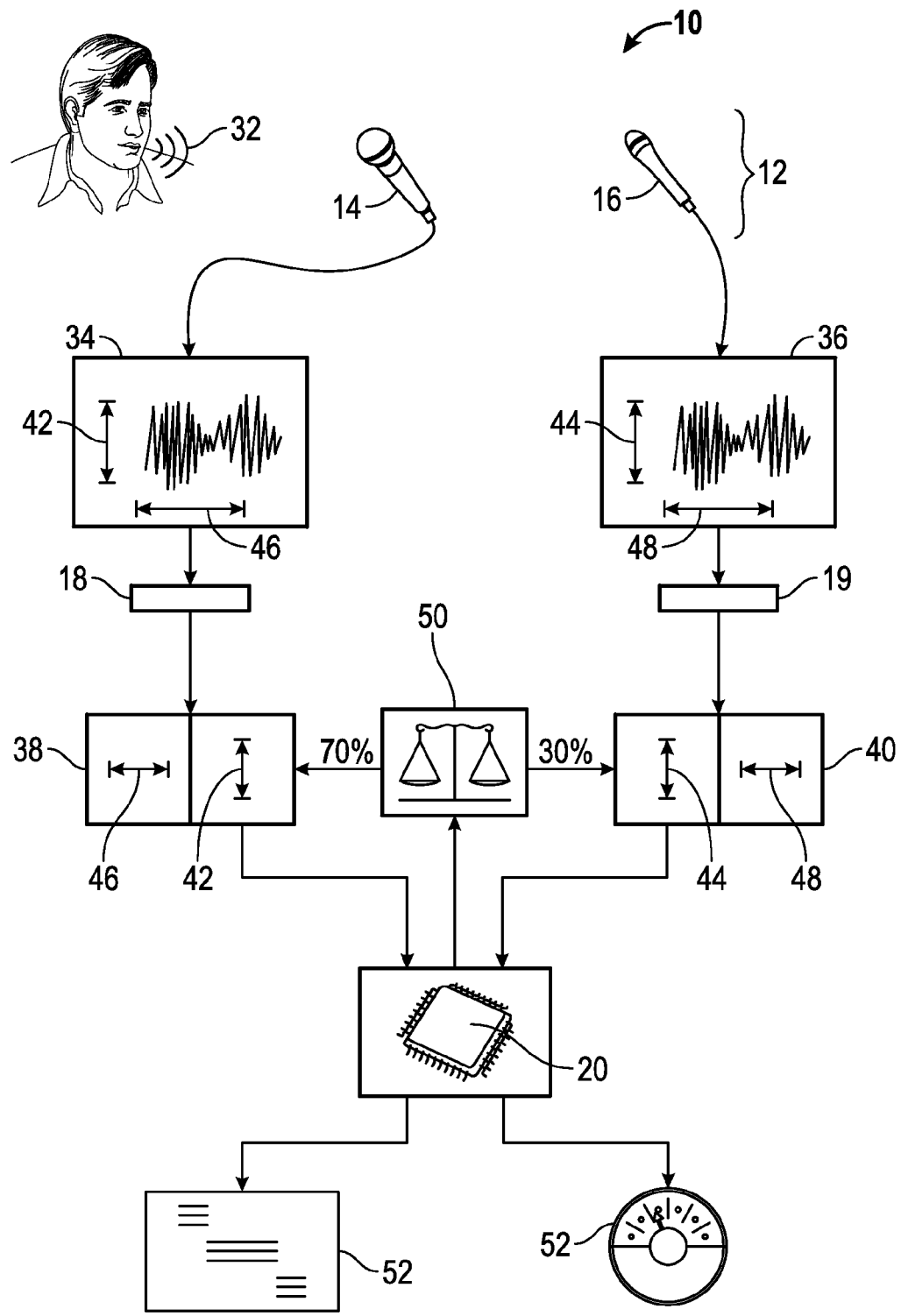
FIG. 4 is a block diagram depicting a speech recognition system.

The processor 20 may be programmed to classify the spoken words, and then use that classification to weight the signals received from the microphones 14 and 16, as shown in FIG. 4, with continuing reference to FIGS. 1-3. Acoustic energy 32 is converted into first and second analog electronic signals 34 and 36 by the first and second microphones 14 and 16, respectively. The analog electronic signals 34 and 36 comprise first and second amplitude responses 42 and 44 and first and second phase responses 46 and 48, respectively, where the amplitude and phase responses 42, 44, 46, and 48 can be differentiated within the analog signals 34 and 36. The A/D converters 18 and 19 convert the analog electronic signals 34 and 36 into first and second digital electronic signals 38 and 40, respectively. The digital electronic signals 38 and 40 include a digital representation for the amplitude responses 42 and 44, which can be a simple number representing the amplitude, as well as a digital representation for the phase responses 46 and 48. The phase responses 46 and 48 from each of a plurality of microphones 14 and 16 may be aligned to ensure the digital electronic signals 38 and 40 are matched and aligned for a spoken word or other sound. The alignment may be at the analog or digital phase, as long as the alignment is in place for the digital phase. The phase responses 46 and 48 may be aligned in a variety of ways, including timing factors from the microphones 14 and 16 or electronic comparison of the phase responses 46 and 48.

After the analog electronic signals 34 and 36 have been converted to digital format, the digital electronic signals 38 and 40 can be analyzed and classified by the processor 20. The processor 20 may utilize a weighting process 50 to weight the digital signals 38 and 40 from the microphones 14 and 16. In many embodiments, the weighting process 50 is performed within the processor 20, but it is possible to weight the either the analog electrical signals 34 and 36 or the digital electrical signals 38 and 40 before it is received by the processor 20. The signal can generally be manipulated before or after it is converted to a digital format, but the processor 20 utilizes the digital format so manipulations are performed in the digital format in many embodiments. However, is should be understood that references to signal manipulations in the digital form could also be performed in the analog form.

In one embodiment, the first microphone 14 has a better frequency response for low frequencies and provides a stronger overall response for the low frequencies. In this embodiment, the first microphone 14 may be more heavily weighted than the second microphone 16 for classifications that require extra emphasis on low frequencies, but less emphasis on high frequencies, such as tonal languages. The second digital electrical signal 40 may be more heavily weighted than the first 38 for classifications that require extra emphasis on high frequencies, but less emphasis on low frequencies, which may include non-tonal languages. Some weight may be provided to both microphones 14 and 16, so higher frequency sounds are detected by the second microphone 16 and the stronger low frequency performance of the first microphone 14 is utilized. In this manner, fricatives or other high pitched sounds are captured even when extra weight is given to the lower frequencies.

The processor 20 may only weight the amplitude response portions of the electronic signals 38 and 40. The amplitude responses 42 and 44 are weighted to emphasize the electronic signals 38 or 40 from the microphone 14 or 16 best suited for a particular task. The details of the digital electronic signals 38 and 40 are easier for the processor 20 to distinguish with stronger amplitude responses 42 and 44, which facilitates better word recognition. The electronic signals 38 and 40 may be separated into a plurality of different frequency units, and the weighting of the amplitude responses 42 and 44 may be performed for each pre-determined frequency unit. Acoustic energy 32 can be at multiple different frequencies, and the frequency scale is a continuum, so a plurality of pre-determined frequency units can be created and used for weighting the electronic signals 38 and 40. Signal weighting is not required for the phase response portions of the electronic signals 38 and 40, which can be used for aligning the electronic signals 38 and 40 from the plurality of microphones 14 and 16, and for processing to recognize speech.

After the processor 20 has determined the classification of the words, the weighting of the electrical signals 38 and 40 from the microphones 14 and 16 can be employed in a variety of ways. For example, the processor 20 may classify the spoken words when a minimum number of recognized words are identified within a set time period or a set number of words or syllables. As a non-limiting example, the processor 20 may classify the spoken words when at least four out of six spoken words are identified as belonging to a known language. Alternatively, the processor 20 may classify the words when one clearly identified word is classified as belonging to only one language. Some words may have a common meaning for many different languages, such as the word "no", so the processor 20 may classify the words when all identified words in a string are from one known language. Many other classification techniques may be used. For instance, one immediately applicable set of categories for language classification is tonal and non-tonal languages.

After the words are classified, the processor 20 may continue to classify the words on an ongoing basis, so changes in the spoken language would be recognized. The weighting of the electrical signals 38 and 40 is based on a specific classification. Thus, the associated weighting process 50 may then be used for all words going forward from the time of classification, at least until a new and different classification is made. Alternatively, after a classification is made, the associated weighting process 50 may be used retroactively, which requires recording and retrieval of some spoken words. After a positive classification is made, the processor 20 recalls the previous spoken words and weights the signals 38 and 40 received from the microphones 14 and 16 based on that classification. Other classifications and weighting processes 50 could also be used. The language classification can be performed by using known methods such as Bayesian classifiers, Hidden Markov Model based classification systems, back propagation & feed forward neural network based algorithms, etc.

There are many different ways to weight the microphone signals 38 and 40, including linear and non-linear weighting. One example of a relatively simple weighting formula is shown in Equation 1:

$$Y(freq) = A * E(1^{st} mic) + B * E(2^{nd} mic) + F0. \qquad \text{Equation 1:}$$

Where: Y(freq)=the weighted signal used by the processor 20;

A=the weighting coefficient for the first microphone signal;

B=the weighting coefficient for the second microphone signal;

$E(1^{st}$ mic)=the amplitude response 34 from the first microphone 14;

$E(2^{nd}$ mic)=the amplitude response 34 from the second microphone 16; and

F0=the pitch or fundamental harmonic.

The weighting coefficients may be computed using multiple regression analysis, where the criteria could be a specified coarse decibel (dB) threshold for the entire frequency, as well as a bound standard deviation. Other techniques may also be used to determine the weighting coefficients. In one example, there are two sets of weighting coefficients: one for tonal languages, and another for non-tonal languages. The pitch or fundamental harmonic, which can also be referred to as the pitch offset (F0), can be used to improve speech recognition performance for tonal languages. In embodiments where the first microphone 14 has a higher frequency response than the second microphone 16 for sounds under two KHz, the processor 20 may place more weight on the signal from the first microphone 14 for tonal languages. Similarly, for non-tonal languages, the processor 20 may place more weight on the signal from the second microphone 16. The frequency used to distinguish the response of the first and second microphones 14 and 16 can be varied, so a level other than two KHz could also be selected, such as three, four, or five KHz.

In other embodiments, there may be different weighting factors for each known language. There may be a database 30 of languages which includes specific weighting coefficients for each known language. This is akin to a look-up table for maintaining a set of coefficients corresponding to each language that can be stored and persistently adapted for future use. Thus, after the spoken words are classified as belonging to a certain language, the specific weighting coefficients for that language can be used. The speech recognition system 10 could be tested with different languages to develop the language specific weighting coefficients. Regression analysis or other techniques could be used to develop the coefficients from the test results. In this embodiment, language specific weighting coefficients can be assigned for each of a plurality of languages, and the processor 20 assigns language specific weighting to the electronic signals 38 and 40 from the plurality of microphones 14 and 16.

The processor 20 may further customize the microphone signal processing based on voice characteristics of the speaker. For example, the pitch or fundamental harmonic, (F0) in Equation 1, may be adjusted for the voice characteristics of the speaker, where the speaker's voice provides cues to adapting the value of the pitch offset (F0). Alternatively, the weighting factor(s) A and/or B can be adjusted based on the speaker's voice. For example, if the speaker has a very deep voice, the weighting factor A for the signal from the first microphone 14 could be increased. If the speaker has a high voice, the weighting factor A for the signal from the first microphone 14 could be decreased somewhat, or the weighting factor B for the signal from the second microphone 16 could be increased. Other modifications to the microphone signal weighting could also be used for different types of voices or manners of speaking The output 52 of the speech recognition system 10 may be the recognized and classified spoken words. These may comprise a command or action that is performed based on a recognized verbal instruction from the speaker, such as placing a telephone call, adjusting the temperature setting, or starting a timer. The output 52 may also be a display of the spoken words, such as a letter or other document that matches dictation given by the speaker. There are other possible outputs 38, such as language translations or other outputs 38.

In other embodiments, there may be more than two microphones 12 with more than two different frequency response factors. The same techniques and methods described above are applicable. Thus, multiple microphones 12 may be utilized, where each has particular strengths in a given frequency range. It is also possible to provide multiple microphones 12 with a plurality of different frequency responses 26 and 28, where some of the multiple microphones 12 have the same frequency response 26, and others have a different frequency response 28.

Figure 5:
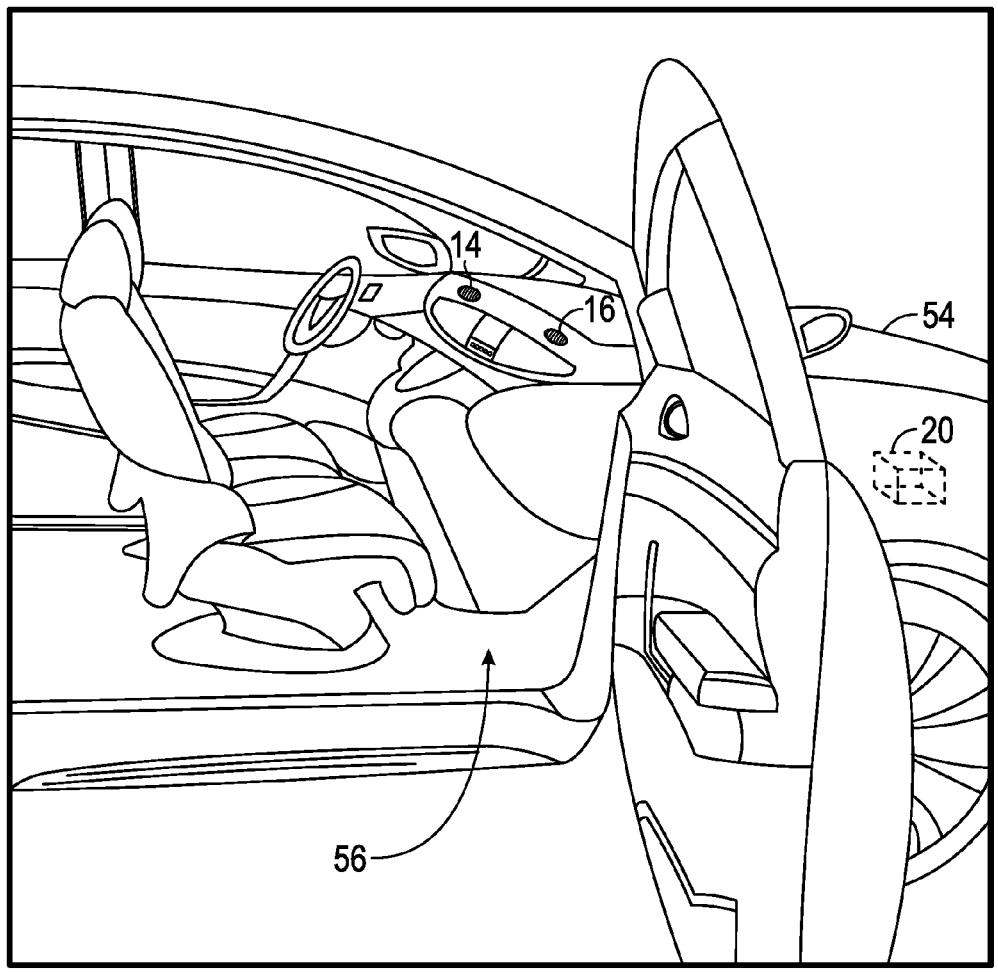
FIG. 5 is an isometric view of a front section of a motor vehicle.

The entire voice recognition system 10 can be included in a motor vehicle 54, as shown in FIG. 5, with continuing reference to FIGS. 1-4. The voice recognition system 10 can increase human interaction with the vehicle 50 without requiring the user to manually operate knobs, buttons, or other controls. This can increase hands-free operation, which can improve safety. For example, it would be safer for the driver of a vehicle 40 to change the radio station, adjust the climate control, or take other actions without removing their hands from the driving wheel. An interactive vehicle 40 with a voice recognition system 10 can facilitate increased hands-free interaction.

The vehicle 54 has a cabin 56 for the driver and passengers. The microphones 12 are located within the vehicle 54 and are positioned to receive acoustic energy 32 from within the cabin 56. The microphones 12 may be positioned within the cabin 56 itself, or outside but sufficiently close to detect acoustic energy 32 from within the cabin 56. The microphones 12 may be covered by a screen, grate, mesh, or other protective cover that allows the passage of sound but impedes dirt and debris. A cover over the microphones 12 could also provide some protection from impact. There could be multiple sets of microphones 12; e.g. different sets for the front and back seats, or different sets for the driver's seat and a front passenger seat. The microphones 12 could be located in the dashboard, a door, a seat, or various other possible locations. Testing and/or acoustical analysis could be used to determine the best or most optimal location for the microphones 12 for each model vehicle 54 offered. The processor 20 could be positioned almost anywhere in the vehicle 54; even outside of the vehicle 54 and coupled to the microphones 12 by wireless means.

Once installed, the weighting of the electrical signals 38 and 40 could be customized to the particular vehicle cabin 56. For example, the acoustics of the cabin 56 could modify the optimal weighting factors for the plurality of microphones 12. Acoustical analysis or custom testing could be performed for each vehicle model offered, and the weighting coefficients could be customized for that vehicle model and cabin acoustics. The modified weighting coefficients could be saved in a database 30 specific for that vehicle model. Therefore, different vehicle models could have different weighting coefficients, or even different mathematical models for weighting the microphones 12, even though the same spoken words and the same classification system are used.

The speech recognition system 10 may be incorporated with existing vehicle interaction systems, such as the system associated with the trademark ONSTAR. The use of microphone arrays with varying frequency responses may help improve the operation and efficiency of speech recognition systems 10 in vehicles 40, as well as speech recognition systems 10 for other uses.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A speech recognition system comprising:
   at least a first and second microphone each having different frequency responses, wherein the first and second microphones are capable of converting acoustic energy into electrical signals; and
   a processor coupled to the first and second microphones and configured to:
      recognize a spoken word based on the signals received from the first and second microphones;
      determine a classification of the spoken word, wherein the classification of the spoken word is by language; and
      weight the signals from the first microphone relative to the signals from the second microphone based on the classification of the spoken word.

2. The speech recognition system of claim 1 further comprising an analog to digital converter coupled between the first and second microphones and the processor.

3. The speech recognition system of claim 1 wherein the electrical signals comprise an amplitude response and a phase response, and wherein the processor is further configured to weight the amplitude response based on the classification of the spoken words.

4. The speech recognition system of claim 3 wherein the processor is further configured to weight the amplitude response for each of a plurality of frequency units.

5. The speech recognition system of claim 1 wherein the frequency response below two kilohertz is higher for the first microphone than for the second microphone, and wherein the processor is further configured to classify the spoken words as part of a tonal language or a non-tonal language and weight the signal from the first microphone more than the signal from the second microphone for tonal languages.

6. The speech recognition system of claim 1 wherein the processor is further configured to assign language specific weighting to the electrical signals for each of a plurality of languages.

7. The speech recognition system of claim 1 wherein the processor is further configured to customize electrical signal processing based on voice characteristics of a speaker.

8. A motor vehicle comprising:
   a cabin;
   at least a first and second microphone each having different frequency responses, wherein the first and second microphones are positioned within the motor vehicle to receive acoustic energy from within the cabin, and wherein the first and second microphones convert the acoustic energy into an electrical signal comprising an amplitude response and a phase response;
   a processor coupled to the first and second microphones, where the processor is configured to:
      recognize a spoken word based on the signals received from the first and second microphones;
      determine a classification of the spoken word; and
      weight the amplitude response of the signals received from the first microphone relative to the signals received from the second microphone based on the classification of the spoken word.

9. The motor vehicle of claim 8 wherein the weighting of the electrical signals is customized for the acoustics of the cabin.

10. The speech recognition system of claim 8 wherein the first and second microphones are capable of converting acoustic energy into analog electrical signals comprising the amplitude response and the phase response, the system further comprising an analog to digital converter coupled to the first and second microphones and to the processor.

11. The motor vehicle of claim 8 wherein the frequency response at less than two kilohertz is higher for the first microphone than for the second microphone, the processor is configured to classify the spoken words as part of a tonal language or a non-tonal language, and the processor is further configured to place more weight on the first microphone electrical signal than the second microphone electrical signal for tonal languages.

12. The motor vehicle of claim 8 wherein the processor is further configured to classify the spoken words by language, and to specifically weight the electrical signals for each of a plurality of languages.

13. The motor vehicle of claim 12 further comprising a database of languages accessible by the processor, and where the database of languages comprises language specific weighting coefficients for the languages.

14. The motor vehicle of claim 8 where the processor is further configured to customize electrical signal processing based on the voice of a speaker.

15. A method of recognizing speech comprising:
   providing at least a first and second microphone having different frequency responses, wherein the first and second microphones are capable of converting acoustic energy into electrical signals;
   receiving the electrical signals from the first and second microphones in a processor;
   processing the signals received from the first and second microphones to determine spoken words;
   classifying the spoken words as belonging to a tonal language or a non-tonal language; and
   weighting the electrical signals from the first microphone relative to the electrical signals from the second microphone based on the classification of the spoken words.

16. The method of claim 15 where the electrical signals produced by the first and second microphones are analog signals comprising an amplitude response and a phase response, the method further comprising:
   converting the first and second microphone signals from analog to digital;
   and wherein weighting the electrical signals from the first and second microphones further comprises weighting the amplitude response of the electrical signals.

17. The method of claim 15 wherein the frequency response at less than two kilohertz is higher for the first microphone than for the second microphone, and wherein the method further comprises weighting the first microphone over the second microphone for tonal languages.

18. The method of claim 15 further comprising:
   testing the first and second microphones and processor with a plurality of languages, and
   developing language specific weighting coefficients for the electrical signals for each language tested.

19. The method of claim 18 further comprising utilizing regression analyses to develop the weighting factors for the electrical signals for each language tested.

20. The method of claim 15 further comprising customizing microphone signal processing based on voice characteristics of a speaker.

* * * * *